May 3, 1966 E. L. TOWNSEND 3,249,303
COMBINATION GAS AND ELECTRIC HOT WATER HEATING SYSTEM
Filed July 13, 1964
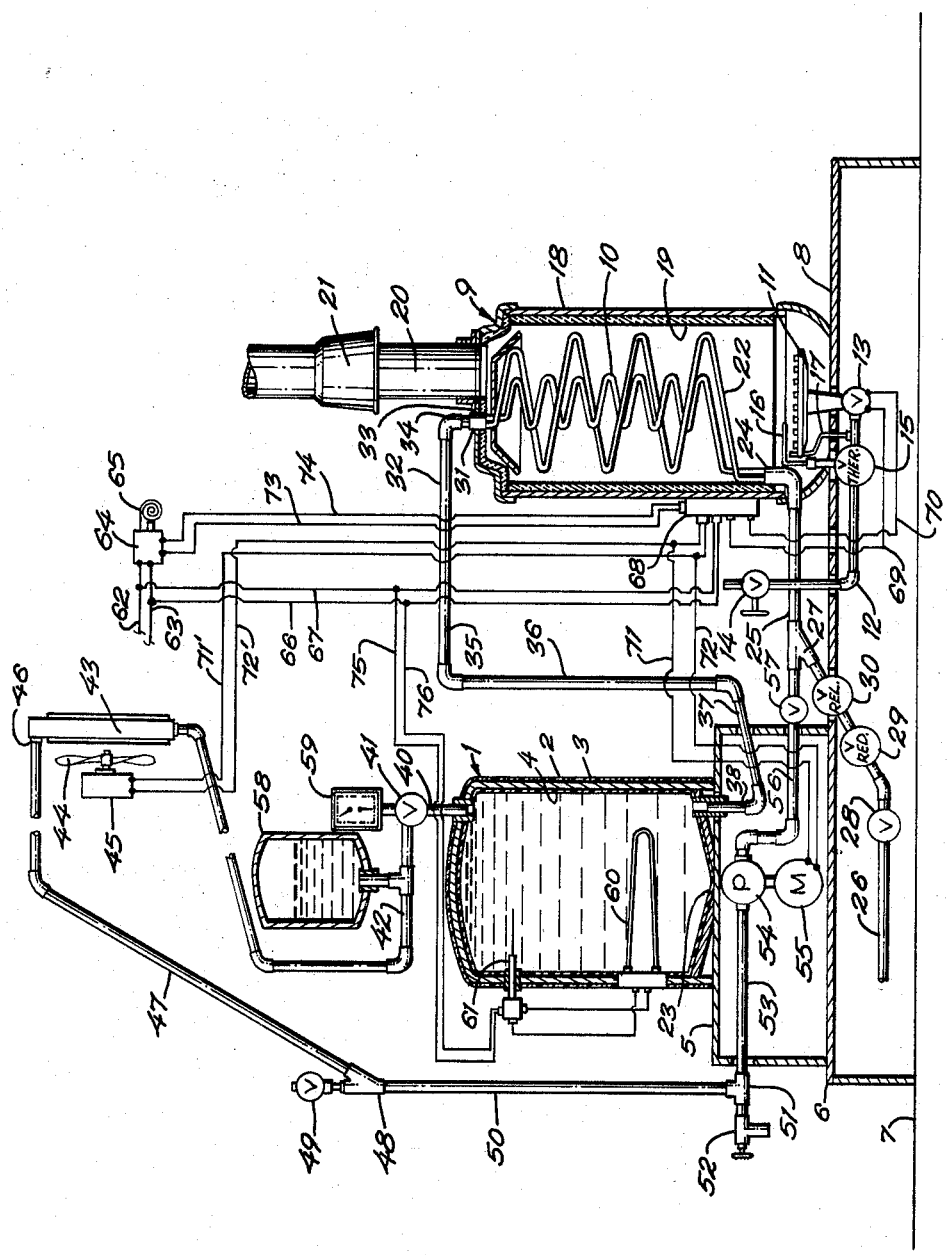
INVENTOR.
Esley L. Townsend
BY
Fishburn and Holl
ATTORNEYS

3,249,303
COMBINATION GAS AND ELECTRIC HOT WATER HEATING SYSTEM
Esley L. Townsend, 1325 W. 4th St., Colby, Kans.
Filed July 13, 1964, Ser. No. 382,235
8 Claims. (Cl. 237—8)

This invention relates to water heating systems, and more particularly to a system wherein electric heating elements and gas fire are used for heating the water used therein.

This invention contemplates a heating system with controls wherein it will operate automatically under control of a room thermostat, using a gas fire for heating of the water and electric heating elements as a booster and to maintain a more even water temperature and also the electric heating elements will provide all of the heat when no gas is available. This invention further contemplates a water storage tank or reservoir connected to a gas-fired water heater for heating the water in the tank with a flow trap between the heater and tank to prevent backflow of heat from the tank to the heater, and a circulator arranged with the piping and tank and heater to provide a hydraulically balanced system which is ready at all times to supply heat when the thermostat calls for same.

The principal objects of the present invention are to provide a combination electric and gas-fired hot water heating system utilizing a gas-fired water heater connected with a hot water storage tank with electric heating elements in the storage tank for heating the water therein and the output of the storage tank connected with suitable radiator units for supplying heat to areas to be heated; to provide such a system in which the water heater is a gas-fired unit with a coil through which water flows as it is being heated with the outlet of the coil at an upper end thereof; to provide such a system that is hydraulically balanced with the level of the storage tank and the heating coil being equal with the lower end on a horizontal line with the bottom of the tank and a connection from the top of the coil to the bottom of the tank that provides a generally S-shape and forms a trap to prevent backflow of heat from the tank to the heating coil; to provide such a system with a circulator pump for moving water from the radiator to the heater coil and then into the tank with a spring-loaded flow control valve between the tank and radiator with the pump substantially balanced in head with said flow control valve; to provide such a heating system with electric heating elements for heating water in the storage tank to substantially maintain the desired temperature therein; to provide a combination gas and electric water heating system with controls for substantially automatic operation; and to provide a combination gas and electric water heating system that is economical to manufacture and efficient in heat output and operation.

Other objects and advantages of this invention will become apparent from the following description taken in connection with the accompanying drawings wherein are set forth by way of illustration and example certain embodiments of this invention.

The figure of the drawing is a diagrammatic view of a hot water system of the present invention.

Referring more in detail to the drawing:

The reference numeral 1 generally designates a main hot water storage tank or reservoir adapted to contain and store water, the tank 1 preferably being of conventional structure having a wall 2 insulated as at 3 and with a suitable lining of glass or other non-corrosive material 4. The tank 1 is preferably mounted on an upper portion or level 5 of a stand 6 which may be of any suitable structure to support the tank 1 above a floor 7. Also, supported on the stand 6 and preferably on a lower level or portion 8 and spaced from the tank 1 is a hot water heater 9. It is preferred that the hot water heater 9 be of conventional structure in which water is passed through suitable heating area, as for example, a double coil conduit 10 and heated by a gas burner 11. Gas is supplied to the burner through a gas line 12 and the flow of gas to the burner 11 is controlled by a solenoid-operated valve 13. The gas line 12 is connected to a suitable source of gas (not shown) and said line has a manually operated valve 14 which is opened when it is desired to have a supply of gas for the burner 11. There is also a conventional temperature-responsive valve apparatus 15 which is opened and maintained in open position when a temperature-responsive element 16 senses a flame from the burner 11 or a pilot light connection 17.

In the illustrated structure, the heater 9 has a shell 18 lined with insulation 19 with the upper end of the heater casing connected to a flue pipe 20 with a conventional draft break 21. The double coil 10 has its lower end 22 substantially on a horizontal level with the bottom 23 of the tank 1, the lower end of the coil being the inlet end and connected as at 24 with the pipe 25 that communicates with a water service line or pipe 26 connected to a suitable source of water supply (not shown). The pipe 26 is connected by a suitable fitting 27 with the pipe 25. Interposed in the pipe 26 is a manually operated valve 28 to open and close the water supply. There is also a pressure-reducing valve 29 to reduce the pressure flowing downstream therefrom to the desired pressure, for example 20 pounds per square inch. Between the pressure-reducing valve 29 and the fitting 27 there is a pressure relief valve 30 arranged to open at a desired maximum pressure, for example 30 pounds per square inch.

The outlet end of the coil 10 is connected as at 31 to a flow pipe 32 that extends from the upper part 33 of the heater 9 in a generally S-shape and, in the illustrated structure, it has a portion 34 extending upwardly from the coil 10 and communicating with a horizontally extending portion 35 that extends to a downwardly extending portion 36 and then a downward inclined portion 37 terminating in an upwardly extending portion 38 that is connected to the bottom 23 in communication with the tank 1 whereby hot water from the heater coil 10 enters the bottom of the tank 1. It is preferred that the upper portion of the S-trap or flow line 32 be relatively close to the top of the heater coil, for example not exceeding 4 inches above the top of said coil 10.

The upper portion of the tank 1 has communication with a pipe 40 in which is located a suitable flow control such as a pressure-responsive or spring-loaded flow control valve 41 which controls flow from the tank 1 through the pipe 40 and through conduits or piping 42 to a suitable radiator 43 located in a room or space to be heated. The radiator may be of a type having substantial length of finned copper tubing with a blower or fan 44 driven by a motor 45 to effect air movement through the radiator to facilitate heating of a room or space. The outlet of the radiator is connected as at 46 to a return conduit or pipe 47 which extends to a fitting 48 having one branch provided with a float type vent 49 and another branch connected to a flow line or pipe 50 which extends to a T-fitting or the like 51. One branch of the T-fitting is connected to a drain valve 52 and the other branch to a flow line 53 leading to a circulator or pump 54 driven by a motor 55. The output of the pump is through a pipe 56 to the fitting 27 which connects it to the input pipe 25 of the heating coil. A valve 57 is preferably arranged in the line 56 between the pump and the fitting 27 for use in purging the system. A pressurized expansion tank 58 is preferably arranged to have a single communication with the conduit or pipe 42. A temperature and pressure gauge 59 is connected to the storage tank adjacent the flow control valve 41.

An electric heating element 60 is mounted in the tank 1 in the lower portion and also mounted in said tank is an Aquastat high limit control 61 electrically connected to the conductors leading to the heating element 60. It is preferred that the Aquastat be set whereby it will interrupt the circuit to the heating element 60 when a desired high temperature is reached, as for example 160 degrees F., and to complete the circuit to the electric heating element when the temperature of the water in the tank reaches a predetermined minimum, as for example 100 to 140 degrees F. Suitable electrical controls for the system are supplied by current from lines 62 and 63 connected to a suitable source of electric current (not shown), said lines 62 and 63 leading to a relay 64 that is actuated in response to a room thermostat 65 in a room to be heated by the radiator 43. The current is supplied by conductors 66 and 67 leading to a control unit 68 on the heater casing which preferably is a combination limit relay for control of the burner and pump motor, said unit 68 being connected by conductors 69 and 70 to the solenoid valve 13 and by conductors 71 and 72 to the pump motor 55. Also, branch conductors 71' and 72' connect the motor 45 in the circuit. The relay 64 is connected by conductors 73 and 74 to the control unit 68. Conductors 75 and 76 are connected to the conductors 66 and 67 and lead to the Aquastat and through said Aquastat 61 to the electric heating element 60.

In operating a structure constructed and assembled as described, the drain valve 52 is closed and the halves 28 and 57 are opened whereby water from the water service line enters the system flowing through the pipes, coil 10, S-strap 32, and into the tank 1. The flow control valve 41 is opened whereby the water can move through to the radiator 43 and fill the system. Then the flow control valve is allowed to return to the normal position. Then the gas valve 14 is opened and the pilot light 17 ignited with the valve 15 held open until the fire sensing element 16 is activated to hold the valve 15 open. This then places the water heater in condition for operation, and it is preferably set to have the solenoid valve 13 open and the burner 11 operating to provide a gas fire for heating water in the coil 10 to a suitable temperature such as 160 degrees F. for a medium temperature. When the temperature of the water goes beyond this setting, the burner control and relay units 68 open the circuit to the valve 13 effecting closing of said valve to stop operation of the burner 11. The S-strap with the balanced arrangement produces a siphon effect whereby heated water in the coil 10 tends to move to and be stored in the tank 1 to be used as needed, depending upon the demands for heat in the room area heated by the radiator 43. This S-strap arrangement also acts as a lock to prevent backflow of heat from the tank 1 to the heating coil 10. When the room's thermostat 65 calls for heat, it energizes the combination relay to the burner and pump motor to effect circulation of water and the heating of the water to 160 degrees F. maximum. The spring-loaded flow control valve 41 is balanced in head with the circulator or pump 54 so that when the pump is operating water is forced through the coil 10, the S-piping or trap 32, tank 1, flow control valve 41, and piping 42 to the radiator 43; the blower 44 being operated blows air through the radiator to heat the room controlled by the thermostat 65. Water flowing through the radiator is returned through the piping 47, 50 and 53 to the pump 54. If the temperature of the water is raised to a maximum that is predetermined, as for example 160 degrees F., the unit 68 effects closing of the valve 13 to shut off the burner 11. The pump 54 continues to run until the room thermostat is satisfied. When the room temperature is such as to satisfy the thermostat 65, the gas burner is cut off and also the pump stops. The temperature will begin to fall within the tank 1 to below the electric Aquastat setting and then the electric heating elements are energized to keep the temperature at an even level within said tank until the high setting of 160 degrees is reached and then the Aquastat will interrupt the circuit to the heating elements. This maintains the water in the tank 1 at a desired temperature at all times so that when the room thermostat calls for heat it is immediately available. If it is desired to operate the system on electric current only, as for example on failure of the gas supply, the gas valve 14 is closed and the electric heating element 60 provides all of the heat for the system, the remainder of the apparatus functioning in the same manner. When the gas supply is again available, the valve 14 is opened, the pilot light again ignited, whereby the system will operate on the combination of gas and electricity.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A gas and electric hot water heating system comprising, a hot water reservoir, an electric heating means for heating the water in said reservoir, a gas-fired hot water heating means spaced from said reservoir and having a hot water outlet at the upper portion of said gas-fired heating means, a conduit means connecting said hot water outlet to a lower portion of said reservoir with a U-shaped portion forming a trap, a heat radiator having an inlet and outlet, flow means communicating the upper portion of the reservoir with the radiator inlet, flow means connecting the radiator outlet to the gas-fired heating means, a flow control valve in the flow means between the reservoir and radiator, a circulator pump in the flow means between the radiator and gas-fired heating means, means driving said pump for moving water through the gas-fired heating means, reservoir, flow control valve, to the radiator and return, an electric circuit connected to said electric heating means in the reservoir including temperature-responsive means for controlling the circuit to the electric heating means to substantially maintain the water in the reservoir at a predetermined temperature, and control means in said electric circuit for effecting operation of said gas-fired heating means and the circulating pump when heat is required from the radiator.

2. A gas and electric hot water heating system as set forth in claim 1 wherein the gas-fired heating means has a pipe coil through which the water flows as it is heated, said coil having a lower end substantially in the same plane as the lower end of the reservoir.

3. A gas and electric hot water heating system as set forth in claim 2 wherein a pressurized expansion tank has a single communication with the flow means between the flow control valve and the radiator.

4. A gas and electric hot water heating system comprising, a main hot water tank, an electric heating means for heating the water in said tank, a gas-fired hot water heating means spaced from said tank and having a hot water outlet at the upper portion of said gas-fired heating means, a conduit means connecting said hot water outlet to a lower portion of said tank, said conduit means being in a generally S-shape with a portion above the heating means and another portion below said tank, a heat radiator having an inlet and outlet, flow means communicating the upper portion of the tank with the radiator inlet, flow means connecting the radiator outlet to the gas-fired heating means, a pressure-responsive flow control valve in the flow means between the tank and radiator, a circulator pump in the flow means between the radiator and gas-fired heating means, means driving said pump for moving water through the gas-fired heating means, tank, flow control valve, to the radiator and return, an electric circuit connected to said electric heating means in the tank including temperature-responsive means for controlling the circuit to the electric heating means to substantially maintain the water in the tank at a predetermined temperature, and control means in said electric circuit for effecting operation of said gas-fired heating means and the circulating pump when heat is required from the radiator.

5. A gas and electric hot water heating system as set forth in claim 4 wherein an expansion tank has communication with the flow means between the flow control valve and the radiator.

6. A gas and electric hot water heating system comprising, a water reservoir, an electric heating element in said reservoir for heating the water therein, a gas-fired hot water heater having a burner in the lower portion and an upright water heating coil thereabove terminating in a lower inlet end and an upper outlet end, pipe means connecting the coil outlet to the bottom portion of the reservoir, said pipe means being generally S-shape with an uppermost portion adjacent to and above the upper end of the heating coil and a lowermost portion adjacent to and below the reservoir, a heat radiator having an inlet and outlet, flow means connecting the upper portion of the reservoir, said pipe means being of generally S-shape with the radiator outlet with the inlet of the heater coil, a pressure-responsive flow control valve in the flow means between the reservoir and radiator, a circulator pump in said flow means between the radiator and the heater coil, means connecting the flow means between the circulator pump and heater coil with a source of water, an electric circuit including a thermostat responsive to temperature in an area to be heated by the radiator and operative to effect operation of the gas burner and the circulator pump when heat is required so that the pump moves water through the heater coil and S-shape pipe to the reservoir and from the reservoir through the flow control valve and flow means to the radiator and return from the radiator to the circulator pump, means connected in the circuit and responsive to a predetermined maximum temperature of water in the reservoir for interrupting operation of the gas burner, and means connected in the electric circuit for energizing said electric heating element to heat the water in the reservoir and substantially maintain the temperature therein.

7. A gas and electric hot water heating system comprising, an upright water reservoir, an electric heating element in said reservoir for heating the water therein, a gas-fired hot water heater having a burner in the lower portion and an upright water heating coil thereabove terminating in a lower inlet end and an upper outlet end, pipe means connecting the coil outlet to the bottom portion of the reservoir, said pipe means being of generally S-shape with an uppermost portion adjacent to and above the upper end of the heating coil and a lowermost portion adjacent to and below the reservoir, a heat radiator having an inlet and outlet, flow means connecting the upper portion of the reservoir with the radiator inlet, flow means connecting the radiator outlet with the inlet of the heater coil, a pressure-responsive flow control valve in the flow means between the reservoir and radiator, a pressurized expansion tank having a single communication with the flow means between the flow control means and the radiator, a circulator pump in said flow means between the radiator and the heater coil, means including a pressure regulator connecting the flow means between the circulator pump and heater coil with a source of water, an electric circuit including a thermostat responsive to temperature in an area to be heated by the radiator and operative to effect operation of the gas burner and the circulator pump when heat is required so that the pump moves water through the heater coil and S-shape pipe to the reservoir and from the reservoir through the flow control valve and flow means to the radiator and return from the radiator through the flow means to the circulator pump, means connected in the circuit and responsive to a predetermined maximum temperature of water in the reservoir for interrupting operation of the gas burner, and means connected in the electric circuit responsive to predetermined maximum and minimum temperatures of water in the reservoir for energizing said electric heating element to heat the water in the reservoir and substantially maintain the temperature therein.

8. A gas and electric hot water heating system comprising, an upright water reservoir, an electric heating element in said reservoir for heating the water therein, a gas-fired hot water heater having a burner in the lower portion and an upright water heating coil thereabove terminating in a lower inlet end and an upper outlet end, said heating coil having the inlet lower end substantially on a horizontal plane with the bottom of the reservoir and the upper outlet end substantially on a level with the top of said reservoir, pipe means connecting the coil outlet to the bottom portion of the reservoir, said pipe means being of generally S-shape with an uppermost portion adjacent to and above the upper end of the heating coil and a lowermost portion adjacent to and below the reservoir, a heat radiator having an inlet and outlet, flow means connecting the upper portion of the reservoir with the radiator inlet, flow means connecting the radiator outlet with the inlet of the heater coil, a spring-loaded flow control valve in the flow means between the reservoir and radiator, an expansion tank communicating with the flow means between the flow control means and the radiator, a circulator pump in said flow means between the radiator and the heater coil, means including a pressure regulator connecting the flow means between the circulator pump and heater coil with a source of water, an electrc circuit including a thermostat responsive to temperature in an area to be heated by the radiator and operative when heat is indicated to effect operation of the gas burner and the circulator pump when heat is required so that the pump moves water through the heater coil and S-shape pipe to the reservoir and from the reservoir through the flow control valve and flow means to the radiator and return from the radiator through the flow means to the circulator pump, said circulator pump operating during the period of heat demand indicated by the thermostat, means connected in the circuit and responsive to a predetermined maximum temperature of water in the reservoir for interrupting operation of the gas burner, and means connected in the electric circuit and responsive to predetermined maximum and minimum temperatures of the water in the reservoir for energizing said electric heating element to heat the water in the reservoir and substantially maintain the temperature therein.

References Cited by the Examiner

UNITED STATES PATENTS

| 2,159,284 | 5/1939 | Miller | 237—63 X |
| 2,189,941 | 2/1940 | Cornell | 237—63 X |
| 2,434,575 | 1/1948 | Marshall | 237—8 |
| 3,171,387 | 3/1965 | Muller | 237—8 X |

FOREIGN PATENTS 95,666　3/1960　Norway.

EDWARD J. MICHAEL, *Primary Examiner.*